Patented July 7, 1936

2,047,144

UNITED STATES PATENT OFFICE 2,047,144

STABILIZED EPINEPHRINE-TYPE COMPOUND, AND PROCESS OF STABILIZING IT

Morris S. Kharasch, Chicago, Ill., assignor to Eli Lilly and Company, Indianapolis, Ind., a corporation of Indiana No Drawing. Application March 26, 1934, Serial No. 717,428

14 Claims. (Cl. 260—128.5)

It is the object of my invention to obtain a more effective stabilization than has heretofore been obtained of epinephrine (adrenalin), and of other epinephrine-type compounds which like epinephrine have a substituted-amino group, or an amino group ($NH_2$), connected to a mono- or poly-hydroxy phenolic group through an intervening two-carbon chain having a hydroxy group on the carbon atom adjacent to the phenolic group, including compounds structurally and/or optically isomeric with epinephrine; and particularly to protect the substance against the effects of oxygen and heat.

It is well recognized that when solutions of the now-known epinephrine salts, such as the hydrochloride, are kept in air, they slowly acquire a gradually deepening pink color, and that later a black solid separates; especially under the action of heat. This reaction, which is one of oxidation by oxygen, is usually markedly accelerated by heating the epinephrine hydrochloride solution to 100° C., whereupon within 15 to 30 minutes a heavy black precipitate usually forms.

This tremendous instability of epinephrine has forced manufacturers of epinephrine preparations to resort to the following expedients to prevent deterioration:

a. The hydrogen ion concentration of the solution is maintained at pH2 to pH3.

b. The material is kept in dark bottles.

c. The solutions are ordinarily saturated with carbon-dioxide gas, to decrease the amount of oxygen contained in the solution and thereby to decrease the oxidation of the epinephrine.

Other reagents are also added, by various manufacturers, in an attempt to promote stability.

A somewhat similar situation exists with respect to the stability of 3,4-dihydroxy-nor-ephedrine, which is also often called 3,4-dioxy-nor-ephedrine; which is isomeric with epinephrine, as the following structural formulas show:

Epinephrine:

(1) 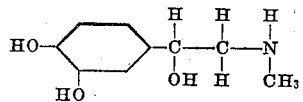

3,4-dihydroxy-nor-ephedrine:

(2) 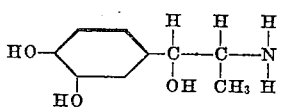

But none of these expedients, nor all of them together, are very effective; as is indicated by the fact that manufacturers of epinephrine preparations ordinarily suggest that solutions of those preparations be rejected if they develop a pink color; and by the fact that to sterilize such preparations they are ordinarily heated for only a few brief moments, instead of for the much longer time which is commonly deemed necessary for effective sterilization of pharmaceutical products.

I have now found that epinephrine and its compounds, and similar types of isomeric and epinephrine-like substances containing the hydroxyl groups on the benzene ring in different positions or including only one hydroxyl group on the benzene ring—all of which may be included in the term epinephrine-type substances—can be effectively protected against atmospheric oxygen and heat by the use of sulfhydryl derivatives or tautomeric substances which in one tautomeric form are sulfhydryl compounds.

There are three distinct classes of these stabilizing substances that tend to stabilize epinephrine and epinephrine-like substances. These are:

1. Organic thiol acids.
2. Substances of the mercaptan type.
3. Tautomeric substances which in one tautomeric form are compounds containing thiol (sulfhydryl) groupings. Of these tautomeric substances, the thioureas, including thiourea itself and its nitrogen-substituted derivatives, are the most desirable.

By either of the terms "a compound containing a sulfhydryl group" and "a thiol compound" I mean to include all three of these classes.

While the effects of any of these reagents are essentially the same—the inactivation of the oxygen of air through the effect of the thiol group—the procedure of preparing active and stable epinephrine and epinephrine-like preparations varies according to the type of stabilizing reagent employed. This will become clear in the discussion of the examples given hereinafter. It is sufficient here to say that in using the first class of substances a water solution or suspension of epinephrine, or epinephrine-like base is treated with an organic thiol acid, which combines with such base to form a corresponding salt, a new type of compound; and that in using the second and third class of substances, a water-soluble salt of epinephrine or of the epinephrine-like base is used, and the stabilizing substance is added to a solution of that salt. That is, the stabilizing substance may or may not be part of the molecular structure of the epinephrine or epinephrine-like preparation. In other words, they may be either added ingredients initially separate from the epinephrine or epinephrine-like preparations, or may be part of such preparations.

In the first class of stabilizers, many different organic thiol acids can be used. Among such acids are:
- a. Thioglycollic acid.
- b. β-sulfhydrylpropionic acid.
- c. Thiosalicylic acid.
- d. p-sulfhydrylsulfonic acid.
- e. p-sulfhydrylphenylacetic acid.
- f. p-sulfhydrylphenylsulfonic acid.
- g. Thiolactic acid.

These are merely examples, as any other organic thiol acids may be used. The choice of the organic thiol acid used depends upon the application for which the particular preparation is intended. Some of the thiol acids have objectionable odors, such as thioglycollic acid, and may be undesirable for certain purposes; while other thiol acids, such as p-sulfhydrylphenyl sulfonic acid, have no odor.

When epinephrine or epinephrine-like bases, such as nor-epinephrine or 3,4-dihydroxy-nor-ephedrine, are dissolved in the thiol acid, to form the corresponding salts, the salt formation does not take place through the sulfhydryl group, but instead through the agency of some other acidic group present in the molecule; for other acidic groups are in general more strongly acidic than is the sulfhydryl group.

These thiol-acid salts of epinephrine and epinephrine-like bases are new, and have various advantages. They are relatively stable against oxygen and heat; and furthermore are stable at a considerably higher pH than are the salts of epinephrine and epinephrine-like bases with inorganic acids, although the maximum stability of my thiol salts of epinephrine and epinephrine-like bases is obtained at about pH 3. It is possible to obtain this optimum hydrogen ion concentration by controlling the quantity of organic thiol acid used—usually by adding to one mole of the epinephrine base about three moles of the thiol acid.

In the second and third classes of stabilization compounds, the stabilization may be of an inorganic-acid salt of epinephrine or an epinephrine-like base, such as nor-epinephrine or 3,4-dihydroxy-nor-ephedrine, with no direct entrance of the sulfhydryl group into the molecule with the base save that which may occur incidentally in connection with ionization of these molecules. These second and third classes of thiol compounds include mercaptans, and tautomeric substances which in one tautomeric form are thiol compounds.

The case of thiosinamine (allyl thiourea) and thiosemicarbazide are examples of what I mean by tautomerization. The formula of thiosinamine shows this. This formula is usually written by chemists in two ways, to denote that equilibrium exists between the two tautomeric forms, as follows:

Such a tautomeric substance reacts as though it possessed both constitutions, reacting according to either constitution as occasion requires.

There are many substances coming within classes 2 and 3. The following are examples:

*Mercaptans*
- a. Ethyl mercaptan.
- b. Benzyl mercaptan.
- c. Thiophenol.
- d. p-thiocresol.

*Thioureas*
- e. Thiosinamine.
- f. Thiourea.
- g. Thiosemicarbazide.

The following examples indicate the method of carrying out my invention; and the effects of some of the compounds of the various classes indicated in producing stabilization, the importance of the hydrogen ion concentration, (for all epinephrine salts including mine are more stable at lower pH values,) and the comparison of the results obtained with unstabilized epinephrine hydrochloride as a control.

In all these tests, one-tenth of a gram of epinephrine or epinephrine-like base, such as 3,4-dihydroxy-nor-ephedrine, is suspended in 100 cc. of water, and the salt formed either by adding hydrochloric acid if the hydrochloride salt is desired or by adding the desired organic thiol acid if a thiol-acid salt is desired. In both instances the hydrogen ion concentration is adjusted to the value indicated by varying the amount of acid added; and in the case of stabilizers in classes 2 and 3, the amount of stabilizer added is indicated. In each case the epinephrine or epinephrine-like compound, with whatever reagent is added, is heated at a temperature of 100° C. in a sealed tube containing some air, and the tube is examined at various time intervals.

*Table of comparative stabilities*

| Epinephrine compound | Stabilizing reagent added | pH | Time of heating | Result |
|---|---|---|---|---|
| 1. Epinephrine hydrochloride. | None. Control. | 3.0 | 1 hour. | Dark colored solution. |
| | | 6.0 | 1 hour. | Dark colored solution. |
| | | 7.0 | 1 hour. | Solution turned pink while pH was adjusted—1 hr. black ppt. |
| 2. Epinephrine | p-Sulfhydryl phenylsulfonic acid. | 3.0 | 13 hours. | Colorless solution. |
| | | 5.2 | 1 hour. | Faint yellow color. |
| | | 6.0 | 1 hour. | Faint yellow color. |
| 3. Epinephrine. | Thioglycollic acid. | 3.0 | 15 hours. | Colorless solution. |
| | | 5.0 | 10½ hours. | Faint yellow color. |
| | | 6.2 | 1 hour. | Light yellow color. |

Table of comparative stabilities—Continued

| Epinephrine compound | Stabilizing reagent added | pH | Time of heating | Result |
|---|---|---|---|---|
| 4. Epinephrine. | β-sulfhydryl propionic acid. | 3.0 | 10 hours. | Colorless solution. |
| 5. Epinephrine. | Thiosalicylic acid. | 3.0 | 2 hours. | Colorless solution. |
| 6. Epinephrine. | Thiolactic acid. | 3.0 | 10 hours. | Colorless solution. |
| 7. Epinephrine. | Various isomeric sulfhydryl naphthalene sulfonic acids. | 3.0 | 2-10 hours. | Colorless solutions. |
| 8. Epinephrine hydrochloride. | Ethyl mercaptan. (0.1 g.) | 3.0 | 4 hours. | Slightly colored solution. |
|  |  | 6.0 | 1 hour. | Pink colored solution. |
| 9. Epinephrine hydrochloride. | Benzyl mercaptan (0.1 g.). | 7.0 | 3 hours. | Dark colored solution. |
|  |  | 3.0 | 7 hours. | Solution colorless, but slightly turbid due to insolubility of benzyl-mercaptan. |
|  |  | 6.0 | 7 hours. | Colorless solution, slightly opalescent. |
|  |  | 7.0 | 7 hours. | Practically colorless solution, with only slight turbidity, due to insolubility of mercaptan in water. |
| 10. Epinephrine hydrochloride. | Thiophenol (0.1 g.). | 3.0 | 7 hours. | Solution colorless, but slightly turbid due to insolubility of thiophenol. |
|  |  | 6.0 | 7 hours. | Colorless solution, slightly opalescent. |
|  |  | 7.0 | 7 hours. | Pink colored solution slightly turbid. |
| 11. Epinephrine hydrochloride. | Thiosinamine (allyl thiourea) (0.2 g.). | 3.0 | 8 hours. | Colorless solution. |
|  |  | 3.0 | 11 hours. | Colorless solution with faint turbidity. |
|  |  | 4.0 | ½ hour. | Pink colored solution. |
| 12. Epinephrine hydrochloride. | Thiourea (0.1 g.). | 3.0 | 1 hour. | Faint yellow colored solution. |
|  |  | 3.0 | 4 hours. | Definite yellow colored solution. |
| 13. Epinephrine hydrochloride. | Thiocresol (0.1 g.). | 3.0 | 8 hours. | Colorless solution with slight turbidity. |
| 14. Epinephrine hydrochloride. | Thiosemicarbazide hydrochloride (0.1 g.). | 3.0 | 8 hours. | Colorless solution. |
| 15. 3,4-Dihydroxy-nor-ephedrine hydrochloride. | None. Control. | 3.0 | 4 hours. | Black precipitate formed at the end of the first hour. Compound completely decomposed at the end of four hours. |
| 16. 3,4-Dihydroxy-nor-ephedrine. | p-Sulfhydryl-sulfonic acid. | 3.0 | 14 hours. | Colorless solution. |
| 17. 3,4-Dihydroxy-nor-ephedrine hydrochloride. | Thiourea (0.1 g.). | 3.0 | 14 hours. | Colorless solution. |
| 18. 3,4-Dihydroxy-nor-ephedrine hydrochloride. | Thiosinamine (allyl thiourea) (0.2 g.). | 3.0 | 14 hours. | Colorless solution. |

The foregoing table shows that in the cases of epinephrine hydrochloride and 3,4-dihydroxy-nor-ephedrine hydrochloride only, without a stabilizing reagent, was there any considerable darkening, or any formation of a black precipitate. With the stabilizing reagents which contained thiol groups or which tautomerize to compounds having thiol groups, whether or not the thiol compound entered directly into chemical combination with the epinephrine or with the 3,4-dihydroxy-nor-ephedrine, there is at most only a relatively slight deterioration, even at the higher pH values although even with these stabilizing reagents the best effects are obtained if the hydrogen ion concentration is maintained in the neighborhood of pH3.

While I am not certain what the precise nature is of the protective action due to the presence of sulfhydryl groups, my theory of such action is that because the sulfhydryl groups are easily oxidized (by the oxygen of the air) to disulfide compounds, they tend to react with any oxygen which may be present; and thus prevent the oxygen from acting upon the epinephrine or epinephrine-like substance. Whether or not this is the correct theory of the action, I have found as a fact that the presence of compounds containing the sulfhydryl group do serve very effectively to stabilize epinephrine and epinephrine-like compounds in solution, whether the substance containing the sulfhydryl group is or is not present in the same molecule with the epinephrine or epinephrine-like substance.

I claim as my invention:

1. The process of stabilizing a solution containing a salt of an epinephrine-type compound; which consists in having present in such solution a compound containing a sulfhydryl group.

2. The process of stabilizing a water solution of a salt of an epinephrine-type compound; which consists in adding a thiol compound to such solution.

3. The process of producing a stable water solution of a salt of an epinephrine-type compound; which consists in producing a reaction of the epinephrine-type base with a thiol acid to produce a stable water-soluble salt.

4. A new composition of matter, consisting of a salt formed by the reaction of an epinephrine-type compound with an organic thiol acid.

5. The process of stabilizing a solution containing a salt of epinephrine; which consists in having present in such solution a compound containing a sulfhydryl group.

6. The process of stabilizing a water solution of a salt of epinephrine; which consists in adding a thiol compound to such solution.

7. The process of producing a stable water solution of a salt of epinephrine; which consists in producing a reaction of the epinephrine base with a thiol acid to produce a stable water-soluble salt.

8. A new composition of matter, consisting of a salt formed by the reaction of epinephrine with an organic thiol acid.

9. The process of stabilizing a solution containing a salt of 3,4-dihydroxy-nor-ephedrine; which consists in having present in such solution a compound containing a sulfhydryl group.

10. The process of stabilizing a water solution of a salt of 3,4-dihydroxy-nor-ephedrine; which consists in adding a thiol compound to such solution.

11. The process of producing a stable water solution of a salt of 3,4-dihydroxy-nor-ephedrine; which consists in producing a reaction of the 3-4-dihydroxy-nor-ephedrine base with a thiol acid to produce a stable water-soluble salt.

12. A new composition of matter, consisting of a salt formed by the reaction of 3,4-dihydroxy-nor-ephedrine with an organic thiol acid.

13. The process of stabilizing a solution containing a salt of an epinephrine-type compound; which consists in having a thiourea present in such solution.

14. The process of stabilizing a solution containing a salt of an epinephrine-type compound; which consists in having thiourea present in such solution.

MORRIS S. KHARASCH.